J. S. HILL.
STEERING WHEEL.
APPLICATION FILED FEB. 12, 1914.
1,091,932.
Patented Mar. 31, 1914.
2 SHEETS—SHEET 1.
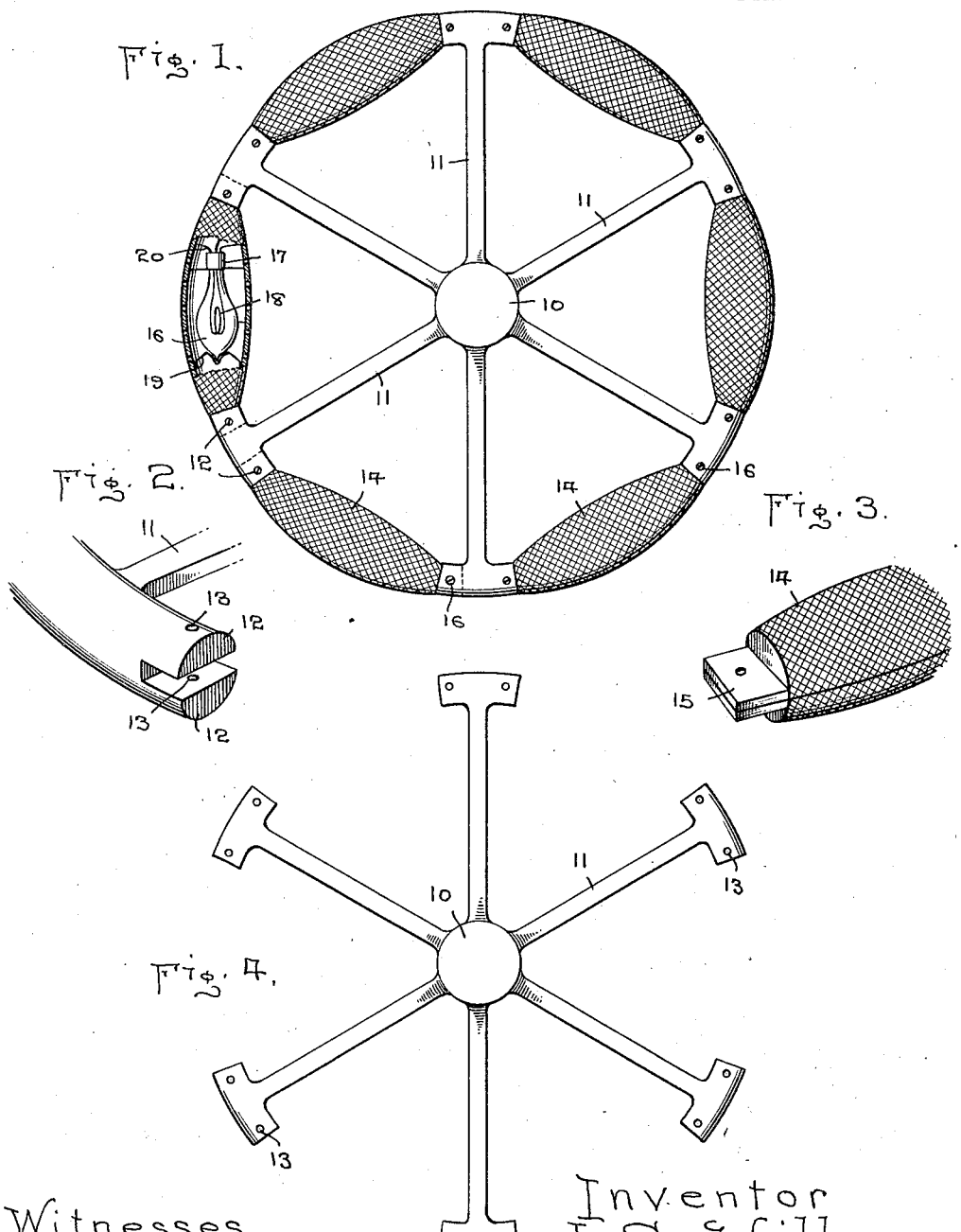

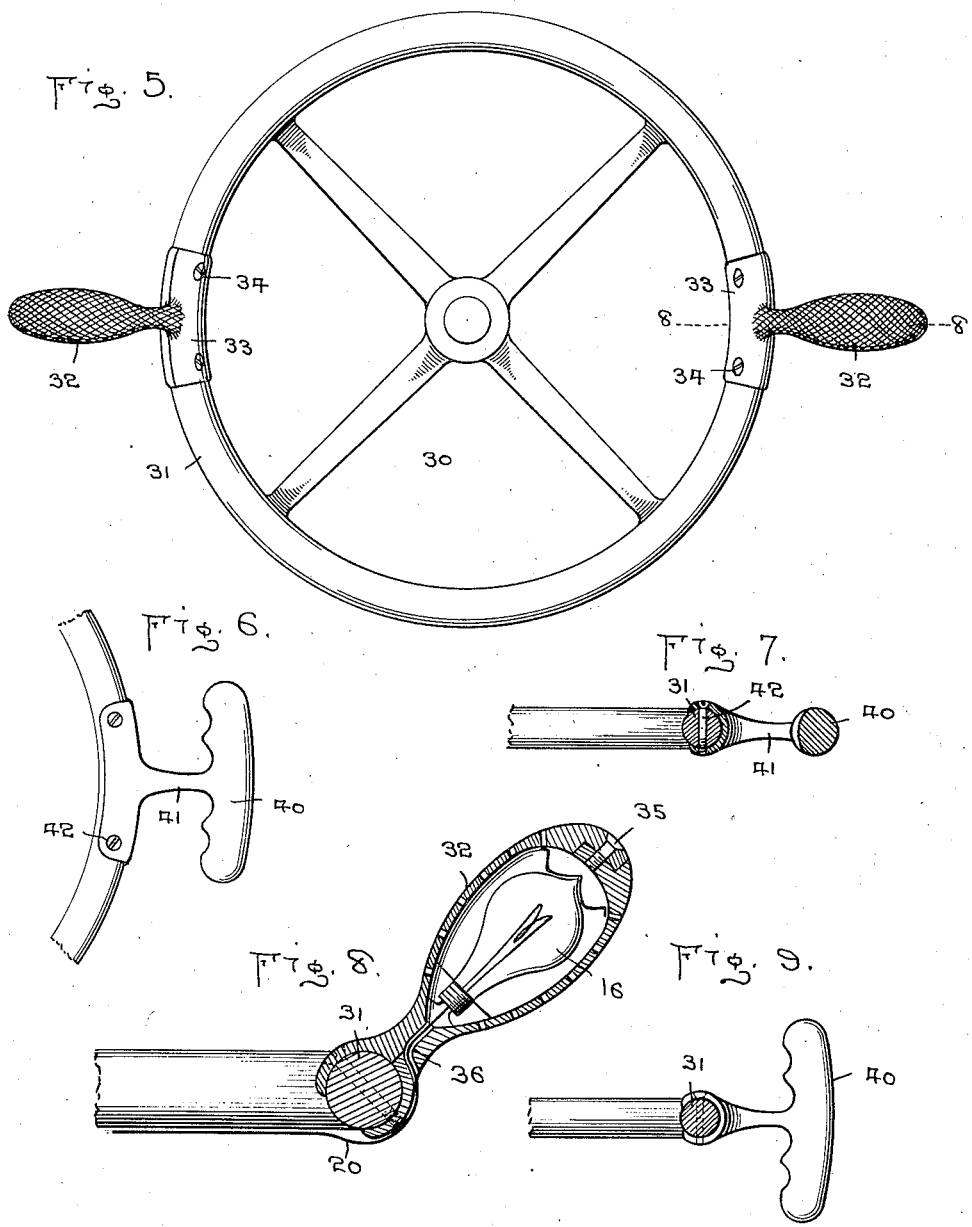

UNITED STATES PATENT OFFICE.

JOSEPH S. HILL, OF BETHESDA, MARYLAND.

STEERING-WHEEL.

1,091,932.　　　　Specification of Letters Patent.　　Patented Mar. 31, 1914.

Application filed February 12, 1914. Serial No. 818,213.

*To all whom it may concern:*

Be it known that I, JOSEPH S. HILL, a citizen of the United States, residing at Bethesda, in the county of Montgomery and State of Maryland, have invented certain new and useful Improvements in Steering-Wheels; and I do hereby declare the following to be a full, clear, and exact description of the invention, such as will enable others skilled in the art to which it appertains to make and use the same.

An object of this invention is the provision of a steering wheel for motor vehicles comprising a plurality of handles or grips of hollow formation and containing suitable electric heating devices for maintaining the hands of the vehicle driver in a comfortable and warm condition regardless of the temperature of the atmosphere.

With these and other objects in view, the invention consists in the novel construction, formation and arrangement of parts which will be hereinafter specifically described, claimed and illustrated in the accompanying drawings in which, Figure 1 represents a top plan view, partly broken away, showing a steering wheel constructed in accordance with my invention. Fig. 2 represents an enlarged fragmentary perspective view of one of the spokes of the wheel. Fig. 3 represents a similar view of one of the handles or rim segments of the wheel. Fig. 4 represents a top plan view of the hub and spokes of the wheel. Fig. 5 represents a top plan view of a modified construction of the steering wheel. Fig. 6 represents a further modified form of grip radially attached to the ordinary type of steering wheel. Fig. 7 represents a horizontal sectional view through the modification of the invention disclosed in Fig. 6. Fig. 8 represents a sectional view of line 8—8 of Fig. 5, and, Fig. 9 represents a modification of the handle or the grip illustrated in Figs. 6 and 7.

Referring to the drawing in detail, the numeral 10 indicates the hub of the steering wheel which is adapted to be secured to the steering rod or shaft in any approved manner and carries a plurality of radially projecting arms or spokes 11. The outer ends of the spokes 11 are enlarged and formed on each side with laterally projecting pairs of ears 12 having suitable apertures 13 therethrough.

The handles or grips 14 are each formed in two parts divided in a plane longitudinal thereof and having the adjacent faces concaved to provide a housing for the electrical heating device hereinafter referred to. The ends of each part of each grip are reduced and squared at 15 and apertured to be snugly received between the ears 12 of the heads of the spokes. Suitable screws or the like 16 are positioned through the apertures in the ears 12 and the ends 15 for securing the handles or grips 14 in operative position.

A suitable electric light bulb 16 is secured in a socket 17 carried by one part of the handles or grips 14, and is preferably provided with a carbon filament 18, as this type of lamp generates greater heat than the improved tungsten and similar lamps. A suitable spring 19 is secured adjacent the end of the handle 14 opposite the socket 17 and receives the pointed end of the bulb 16 for rigidly securing the latter in position against vibrating or knocking against the walls of its housing. Suitable conducting wires 20 are connected with the socket 17 for supplying electric current to the filaments 18, and these conductors are extended through the spokes 11 and the steering rod or on the outside thereof and are suitably connected with the source of electromotive force by which the ignition or lighting system of the motor vehicle is supplied. The handles or grips 14 may be formed perforate or imperforate as desired but in either instance it is clearly apparent that sufficient heat will radiate or penetrate them to warm the hands of the driver of the vehicle. The handles or grips 14 are preferably of the shape illustrated in Fig. 1 and are substantially circular in cross section and gradually tapered from the medial portion to the opposite ends thereof whereby a firm and natural grip may be obtained thereon with the hand. It will be understood that any one or more of the grips of the wheel may be equipped with the electric heating device shown.

Referring to Fig. 5 wherein is shown a modification of the invention, the numeral 30 indicates a wheel of the ordinary construction carrying a rim 31 on the diametrically opposite sides of which are secured radially projecting grips 32 divided in a longitudinal plane similar to the handles 14 to provide a suitable housing for a similarly electric globe or bulb 16. The inner ends of the grips 32 are concave and enlarged laterally as shown at 33 and secured to the rim 31 by suitable screws 4 and the outer ends thereof are secured together by a suitable screw 35. Electrical conductors 20 by means of which the lamp 16 is supplied with electric current are entered through suitable openings 36 in the handles or grips 32.

In Figs. 6, 7 and 9, a further modification of the invention is disclosed wherein the grips 40 are secured on the outer ends and disposed at right angles to the shanks 41 secured at 42 in a radial plane of the wheel.

What I claim is:—

1. A steering wheel having a hub and a plurality of spokes; a plurality of hollow hand grips operatively mounted between and connected to the ends of the spokes to form the rim of the wheel, and a heating element disposed within the grips.

2. A steering wheel having a hub and a plurality of spokes; the rim of said wheel consisting of a plurality of hollow hand grips removably connected to the ends of the spokes, and a heating element disposed within said grips.

3. A steering wheel comprising a hub a plurality of spokes and a rim, the said rim consisting of a plurality of hand grips operatively connected to the outer ends of the spokes, said grips being formed of two concavo-convex members whereby when they are joined together a cavity will be provided between them, and a heating element operatively mounted within said cavity.

4. A steering wheel having a hub and a plurality of spokes; a rim for said wheel made up of a plurality of hollow hand grips operatively connected to the spokes, and means to removably dispose within the hollow hand grips a suitable heating element.

5. In a steering wheel, a hub carrying a plurality of spokes, and two part grips removably held between adjacent spokes.

6. In a steering wheel, a hub carrying a plurality of spokes, each spoke having a transverse slotted portion, and two part grips removably held in the slotted portions of adjacent spokes.

7. An electrically heated steering wheel comprising a hub carrying a plurality of spokes, each spoke having a transverse slotted portion, two part grips removably held in the slotted portions of adjacent spokes, and heating means within certain of the grips.

8. An electrically heated steering wheel comprising a hub carrying a plurality of spokes, each spoke having a transverse slotted portion; two part grips removably held in the slotted portions of adjacent spokes, and a resiliently supported heating element within certain of the grips.

In testimony whereof I have signed my name to this specification in the presence of two subscribing witnesses.

JOSEPH S. HILL.

Witnesses:
S. W. COCKRELL,
W. T. FITZ GERALD.